United States Patent [19]
Wohnhaas et al.

[11] 3,928,527
[45] Dec. 23, 1975

[54] PREPARATION OF MOLDING PLATE FOR PRODUCTION OF HIGH-PRESSURE DECORATIVE TEXTURED LAMINATES

[75] Inventors: George J. Wohnhaas, Baltimore; Israel S. Ungar; Herbert I. Scher, both of Randallstown, all of Md.

[73] Assignee: Exxon Research and Engineering Company, Linden, N.J.

[22] Filed: Dec. 16, 1974

[21] Appl. No.: 533,855

Related U.S. Application Data

[60] Continuation-in-part of Ser. No. 355,436, April 30, 1973, abandoned, which is a division of Ser. No. 784,933, Dec. 18, 1968, abandoned.

[52] U.S. Cl. ............... 264/258; 156/209; 156/219; 156/220; 264/293
[51] Int. Cl.² ............................................ B29D 9/06
[58] Field of Search.................. 264/258, 284, 293; 156/209, 219, 220

[56] References Cited
UNITED STATES PATENTS

| | | | |
|---|---|---|---|
| 2,442,598 | 6/1948 | Harrison | 264/284 |
| 3,454,457 | 7/1969 | Hale | 156/219 |
| 3,526,558 | 9/1970 | Beeson | 156/219 |

Primary Examiner—Richard R. Kucia
Attorney, Agent, or Firm—Karl W. Flocks

[57] ABSTRACT

A molding die or plate useful for the molding of high-pressure decorative laminates having a textured-surface is provided by shot blasting with non-abrasive balls or pellets a stainless steel plate, electropolishing and electroplating the surface with 30–50 micro inches of chronium.

6 Claims, No Drawings

PREPARATION OF MOLDING PLATE FOR PRODUCTION OF HIGH-PRESSURE DECORATIVE TEXTURED LAMINATES

This is a continuation-in-part of application Ser. No. 355,436 filed Apr. 30, 1973 now abandoned, which in turn is a division of application Ser. No. 784,933, filed Dec. 18, 1968, now abandoned in favor of the divisional application.

The present invention relates to a molding die or plate utilized in the production of high-pressure laminates and, more particularly, to such a metal molding die which directly imparts a textured-surface to the laminate produced, yet which may be used repeatedly in the production of high-pressure laminates.

The production of high-pressure laminates is well known. Generally, such a process involves providing phenolic resin impregnated paper core sheets and melamine resin decorative and overlay sheets and pressing the stacked "book" of resin impregnated sheets under heat on the order of 230°–310°F and under pressure of approximately 1000–1500 lbs. p.s.i. until the resins have been thermoset, thereby providing an extremely hard, attractive and permanent surfacing material, known as a "high-pressure laminate" which has, for many years, found use as table tops, desk tops, counter tops, etc.

In the early years of the production of high-pressure laminates, only glossy surface laminates were produced. This glossy surface was obtained by pressing the resin impregnated paper sheets between polished molding dies or plates. In later years, it has been desirable to provide various types of irregular surfaces, and these various irregular surfaces range from those having relatively shallow depressions which provide a non-glossy, or textured surface to relatively deeply sculptured surfaces which have a noticeable three dimensional effect (such as wood-grain).

The textured-surface laminates have been produced by utilizing a laminated aluminum foil-kraft paper (or other type paper) parting sheet between the upper polished metal molding die and the melamine resin impregnated overlay paper sheet, with the aluminum foil facing the melamine resin overlay sheet. While producing a highly satisfactory product which has been successfully sold for many years, this operation has one serious disadvantage: the laminated aluminum foil paper parting sheet may be used for only one laminating procedure, and after the resultant textured-surface, high-pressure laminate has been produced, such parting sheet must be discarded and another and new parting sheet used for the next lamination. The cost of the aluminum foil-paper laminate parting sheet being not insubstantial, this has necessitated greater operating costs in the production of textured-surface high-pressure laminates compared with glossy high-pressure laminates. Other texture imparting separator sheets including coated papers and silicone resin impregnated papers have also been used, but these are also expensive.

It is, accordingly, an object of the present invention to overcome the deficiencies of the prior art, such as indicated above.

It is another object of the present invention to provide a molding plate or die which may be repeatedly used and which produces a textured-surface, high-pressure laminate with direct contact.

It is another object of the present invention to provide for the manufacture of textured-surface high-pressure decorative laminates in a simpler and less expensive manner.

It is another object of the present invention to provide a molding die or plate which may be used directly in the production of surface textured, high-pressure decorative laminates without the necessity of using an intermediate parting sheet.

These and other objects and the nature and advantages of the instant invention will be more apparent from the following detailed description of an embodiment of the present invention. This description of specific embodiments below will so fully reveal the general nature of the invention that others can, by applying current knowledge, readily modify and/or adapt such embodiments for various applications without departing from the generic concept, and therefore such adaptations and modifications should and are intended to be comprehended within the meaning and range of equivalents of the present invention.

The invention involves the use of a molding die or plate which is formed of a hard, heat-resistant metal, such as steel, and preferably stainless steel, a material from which laminating plates are conveniently made. However, in accordance with the present invention, two (preferably three) particular treatments are carried out on the stainless steel plate in order to render it suitable for directly providing a textured surface, high-pressure laminate during use.

The metal plate is provided with a polished surface. This polishing utilizes a conventional electro-polishing operation. Such electro-polishing operations are well known and the known details of such operations do not, per se, form a part of the present invention.

Another of the three treatments is the provision of a chrome surface on the molding plate. The chrome surface may be provided by direct dipping, by chemical deposition, or any other known method, although a electro-plating is preferred. The thickness of the chromium plating is not critical, although it should be relatively thin. A chromium plating of 30–50 micro inches has been found to be optimum. As with the polishing operation, the details of the provision of a chrome plating in a conventional manner does not, per se form a part of the present invention. Furthermore, this operation is not essential to the invention.

The other of the three treatments involves shot blasting or bombarding the surface of the plate with small, smooth non-abrasive, hard balls or pellets, to provide a finely-roughened surface texture. This is a critical operation, since it has been found that the use of abrasive particles, such as aluminum oxide, silicon carbide, sand, etc. does not produce a satisfactory molding plate. When abrasive particles are used to blast the surface of the plate, and such a plate is used in direct contact with the resin-impregnated paper, the finished laminate sticks to the plate and strips therefrom only with great difficulty, often causing tearing and destruction of the laminate; furthermore, the texture produced is unsatisfactory both in appearance and in "feel".

It is theorized (but applicants do not wish to be limited by this theory) that abrasive grit, having sharp corners and points, causes undercutting of the plate surface during bombardment, while spherical shot, being essentially smooth, causes no such undercutting. In using a plate having undercut portions, the plastic becomes embedded in these undercut portions of the plate during formation of the high-pressure laminate. This embedding may become so strong that the laminates are impossible to remove from the plate; when they are capable of being removed, they have a fuzzy surface due to tearing out of the plastic from the undercut portions. This provides a harsh feel and an unsuitable appearance.

The balls or pellets which may be used in accordance with the present invention preferably comprise spherical steel or chrome steel shot having a diameter of 0.010 to 0.040 inches. This shot is preferably impinged at a velocity of 4400–11,000 ft. per minute. In general, it is preferred to provide a finely-roughened surface of 200–1000 microinches R.M.S.

In sequence, the shot blasting is carried out first followed by the electropolishing; followed by the optional plating. It is surprising that such a high R.M.S. value can be provided, and yet sticking is still avoided. This is believed due in part to the electropolishing.

The following examples will further particularize, without limiting, the invention:

EXAMPLE I

A steel plate is shot blasted or bombarded with non-abrasive balls, in this case chrome steel shot having an SAE designation of S-230 (0.023 inches in diameter). It is then electropolished and provided with a thin, hard chromium surface of 35 microinches of thickness. The plate is used in direct contact with the resin impregnated book to produce textured-surface high-pressure laminates; no aluminum foil-kraft paper parting sheet or other type of parting sheet is used. The laminate, formed under conventional conditions of heat and pressure, releases easily from the plate and its appearance closely simulates that of a conventional textured-surface high-pressure laminate produced with an aluminum foil-kraft paper parting sheet.

EXAMPLE II

A stainless steel plate of suitable dimension is bombarded as in Example I, using spherical steel shot of SAE No. S-110 (0.011 inches in diameter), the velocity of the impingement being approximately 6,000 feet per minute. The shot blasted steel plate is then electro-polished to the desired gloss and is finally chrome-plated with 50 micro inches of chromium. The plate is used in the production of textured-surface textured high-pressure laminates as in Example I. In spite of the laminating conditions of high-pressure and temperature, the plate releases easily from the laminate. The laminate has the desired feel and appearance.

EXAMPLE III

A metal plate such as used in Example II is shot blasted using spherical steel shot of SAE No. S-390 (0.039 inches in diameter). It is then electropolished to provide the desired gloss. A chrome plating of 40 micro inches of chromium is then electro-plated over the shot blasted surface. As in Examples I and II, the molding plate may be repeatedly used without destruction and it consistently provides a highly satisfactory textured-surface high-pressure laminate.

EXAMPLE IV

The procedure of Example II is repeated without providing the die plate with a chrome plating. The results are highly satisfactory.

EXAMPLE V

To compare the effects of the use of a plate which has been blasted with abrasive, a series of tests were carried out. Various plates were bombarded with conventional "sand blasting" cleaning sand and with silicon carbide of the sizes SAE G-80, G-120, G-200 and G-325. As with Example I, the plates were first polished, then chromium plated and finally blasted with the abrasive material. In all cases when such plates were used in the manufacture of high-pressure laminates, the resultant laminate stuck to the plates. In those instances, in which it was possible to separate the metal plate from the resultant laminate, the feel and appearance of the laminate was unsatisfactory.

It is to be understood that the invention is not limited to the embodiments disclosed which are illustratively offered and modifications may be made without departing from the invention.

What is claimed is:

1. The new use of a hard, heat-resistant metallic plate as a molding die to produce high-pressure, textured, decorative laminates, said hard, heat-resistant metallic plate having a polished surface and a finely-roughened texture of 200–1000 microinches R.M.S. provided by bombarding or blasting the surface of said plate at high velocity with small, smooth, non-abrasive hard balls, and then electropolishing, said new use comprising:
   placing a series of resin impregnated fiber sheets directly adjacent said hard, heat-resistant metallic plate having a finely-roughened texture,
   pressing said resin impregnated fiber sheets against said hard, heat-resistant, finely-roughened metallic plate under high pressure and elevated temperature to produce a textured high-pressure laminate,
   stripping said high-pressure laminate from said hard, heat-resistant, finely-roughened metallic plate, and
   re-using said hard, heat-resistant, finely-roughened metallic plate to produce additional textured high-pressure laminates.

2. A process in accordance with claim 1 wherein the surface of said hard, heat-resistant, finely-roughened metallic plate is provided with a thin chromium plating thereon.

3. A process in accordance with claim 2, wherein said chromium plating is 30–50 microinches thick.

4. A process in accordance with claim 1, wherein said hard, heat-resistant metal is stainless steel.

5. A process in accordance with claim 1, wherein the small, hard balls used to provide the finely-roughened texture, comprise chrome-steel shot of approximately 0.010 to 0.040 inches diameter.

6. A process in accordance with claim 1, wherein the high velocity of bombardment to provide said finely-roughened texture is about 4,400 to 11,000 ft. per minute.

* * * * *